April 29, 1952     B. B. JUNKUNC     2,594,656
CORNICE MOUNTING BRACKET
Filed June 16, 1949     3 Sheets-Sheet 1
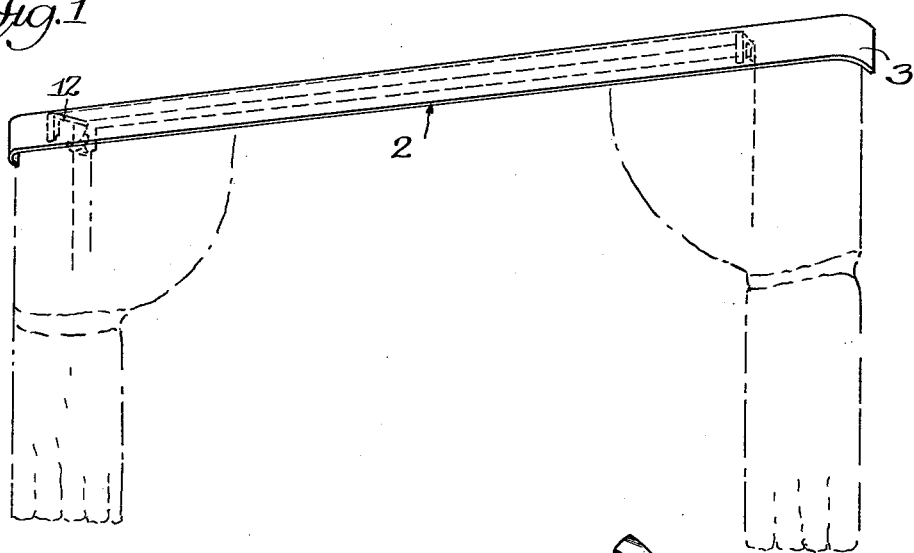
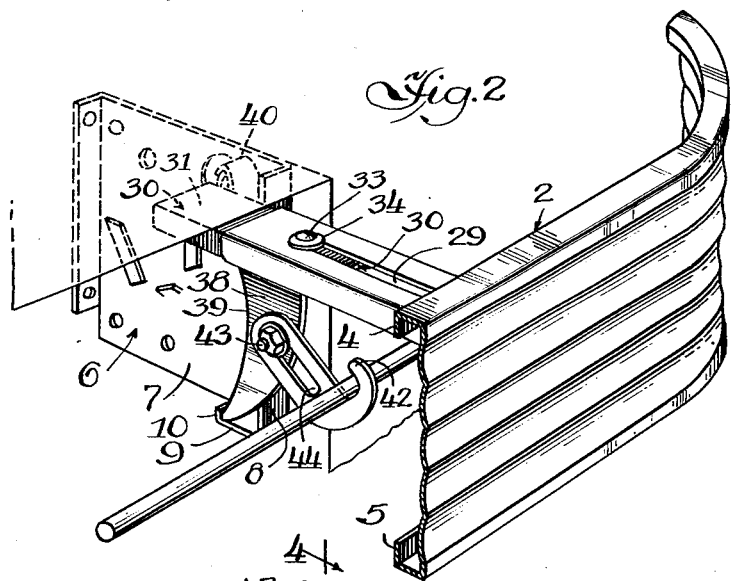
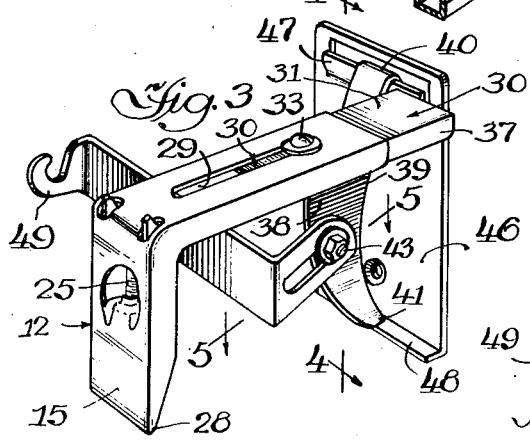
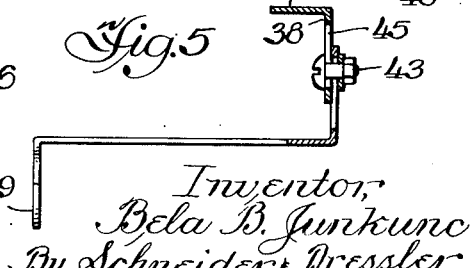
Inventor,
Bela B. Junkunc
By Schneider & Dressler
Attys.

April 29, 1952  B. B. JUNKUNC  2,594,656
CORNICE MOUNTING BRACKET
Filed June 16, 1949  3 Sheets-Sheet 2
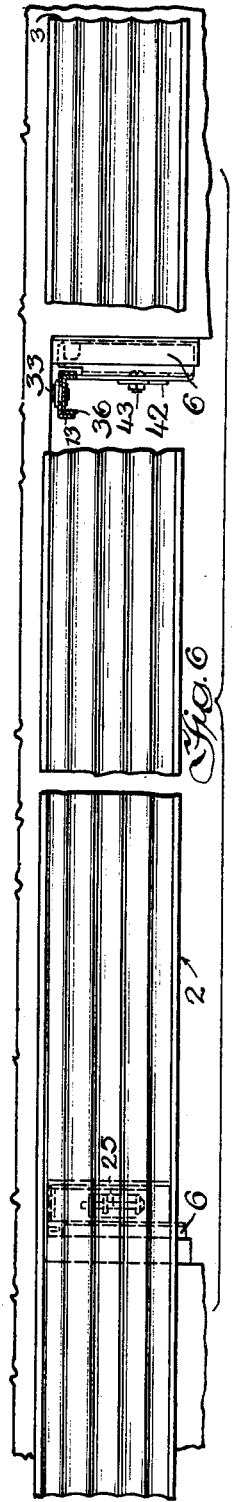
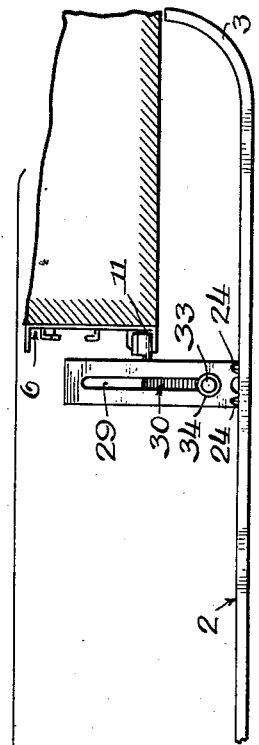
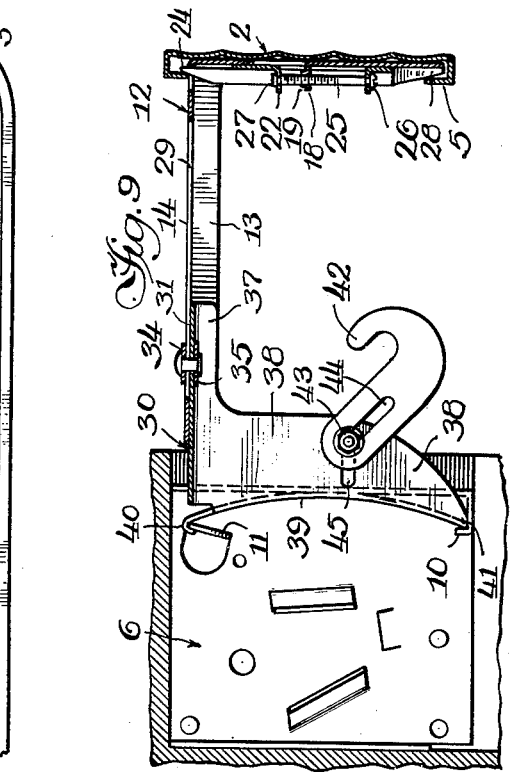
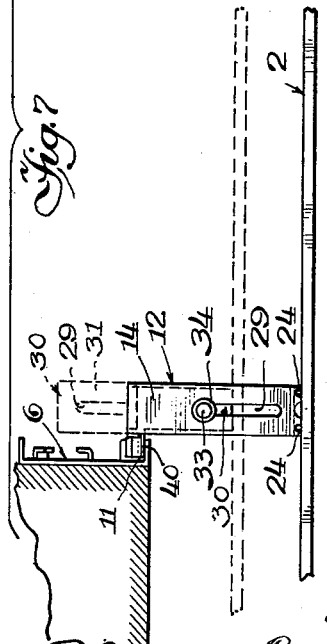
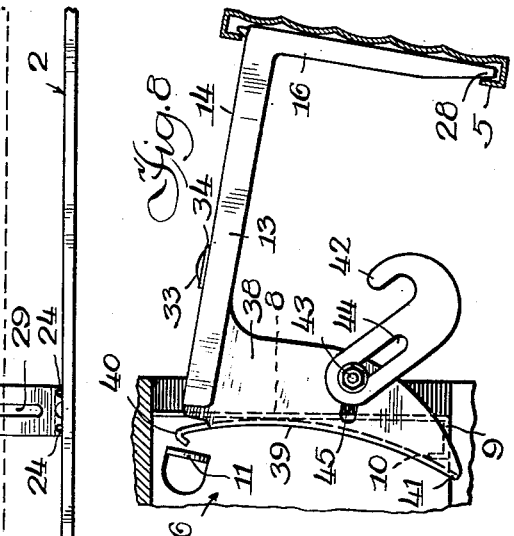
Inventor
Bela B. Junkunc
By Schneider & Dressler
Attys.

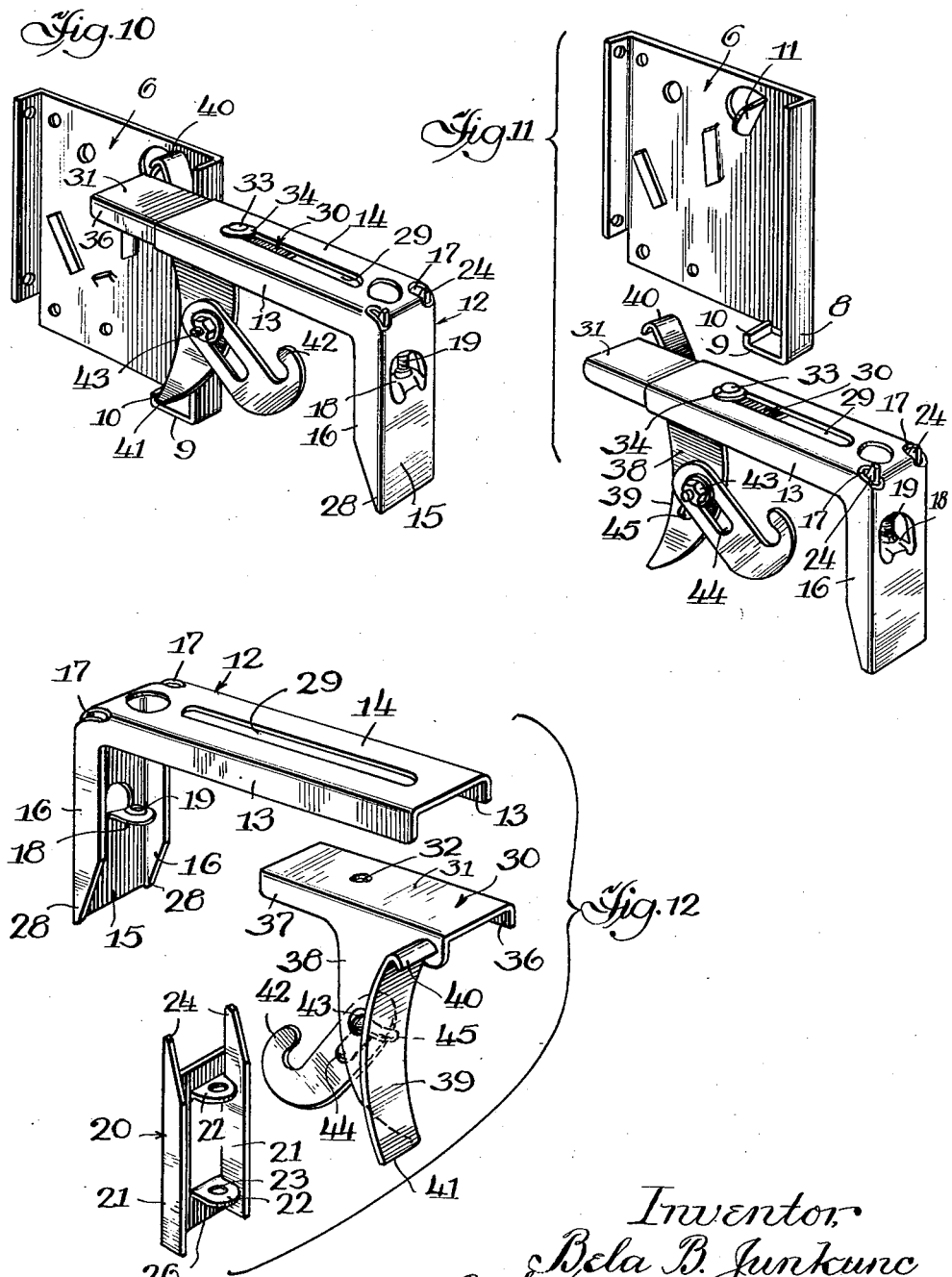

Patented Apr. 29, 1952

2,594,656

UNITED STATES PATENT OFFICE 2,594,656

CORNICE MOUNTING BRACKET

Béla B. Junkunc, Chicago, Ill., assignor to Béla B. Junkunc, Alexander Junkunc, Sr., Alexander Junkunc, Jr., and Joseph G. Junkunc, doing business as J. & J. Tool and Machine Co., Chicago, Ill., a partnership Application June 16, 1949, Serial No. 99,525

16 Claims. (Cl. 160—38)

This invention relates to a cornice mounting bracket which is particularly designed to detachably mount a cornice on side mounting installation brackets permanently or otherwise attached to the side walls of a window casing. The cornice mounting bracket of the present invention also serves to provide support for a curtain or drapery rod.

In my prior application, Serial No. 6,499, filed February 5, 1948, which became Patent No. 2,572,036 dated October 23, 1951, a bracket permanently attached to the cornice engages a side mounting bracket to support the cornice, drapery rod and draperies. In the structure disclosed in the aforesaid application the entire weight of the cornice, rod and draperies is borne by the lower ledge of the installation brackets.

The present invention contemplates an additional support at the top of the installation bracket, and the cornice mounting bracket has a portion resting on this support. In addition, a portion of the cornice mounting bracket is curved to contact the adjacent side wall of the installation bracket and thereby provide a third point of support. The curvature of the cornice mounting bracket also facilitates the positioning of the cornice mounting bracket in the installation bracket.

The cornice mounting bracket is adjustable so that the distance between the cornice and the window may be adjusted to facilitate the installation of a curtain rod and curtains or drapes on the curtain rod. The cornice mounting brackets may be secured to intermediate brackets as well as to the side mounting brackets so that the curtain and drapery rods may receive intermediate support as well as support at each end. The cornice brackets may be provided with a single hook to support either a curtain or drapery rod, or with a pair of hooks to support both curtain and drapery rods.

Two preferred embodiments of the present invention by which the above and other advantages of the invention are attained will be described in detail in the following specification, taken in conjunction with the accompanying drawings, in which:

Figure 1 is a perspective view of a cornice mounted in accordance with this invention, and associated drapes suspended from a drapery supporting rod mounted in the rear of the cornice;

Fig. 2 is a fragmentary perspective view showing one end of the cornice and the cornice mounting bracket attached to one form of a side mounting installation bracket;

Fig. 3 is a detail perspective view of the cornice mounting bracket attached to a different form of installation bracket and showing an offset curtain or drapery rod-supporting hook;

Fig. 4 is a cross sectional view, taken along the line 4—4 of Fig. 3;

Fig. 5 is a cross sectional view, taken along the line 5—5 of Fig. 3;

Fig. 6 is a fragmentary front elevation of the cornice, with a portion broken away to show the structure of the cornice mounting bracket;

Fig. 7 is a fragmentary top elevation of the structure shown in Fig. 6, with a portion of the cornice moved forward to provide additional space behind the cornice for the mounting of curtains or drapes;

Fig. 8 is a side elevation of one of the cornice mounting brackets just prior to attachment to a side mounting installation bracket;

Fig. 9 is a cross sectional view showing the cornice mounting bracket attached to the side mounting installation bracket, with the cornice in place;

Fig. 10 is a perspective detail view showing the cornice mounting bracket secured to the side mounting installation bracket;

Fig. 11 is a perspective detail view of the parts shown in Fig. 10 in partially disassembled relation; and Fig. 12 is a perspective detail view of parts of the cornice mounting bracket in disassembled position.

In the drawings, the reference numeral 2 indicates a cornice having curved ends 3. As shown in Fig. 2, the top and bottom edges of the cornice are provided with inturned flanges 4 and 5 spaced a short distance to the rear of the front surface of the cornice and extending parallel thereto. The front surface is shown as being fluted longitudinally, but it is to be understood that it may be plain or it may have some other suitable configuration. The exact configuration of the front surface of the cornice is not important in so far as the present invention is concerned.

The side mounting installation bracket is indicated generally by the reference numeral 6. The installation bracket comprises a flat plate 7 which may be secured to the side of the window frame in any suitable manner. The front edge of plate 7 is bent at right angles to form a flange 8. The lower edge of flange 8 is bent at right angles to form a foot portion 9 terminating in an upwardly extending free end portion 10. A lip 11 (Fig. 11) is struck from flat plate 7 adjacent its top edge, and extends inwardly at right angles to plate 7. The plate may also be provided with flanges struck therefrom to hold the ends of a Venetian blind assembly. However, the presence or absence of Venetian blinds is of no consequence in connection with the present invention and therefore the means for mounting such blinds will not be described in detail.

As shown in Fig. 12, the cornice mounting bracket comprises an L-shaped member 12 having side flanges 13 depending from its top wall 14. The front wall 15 has rearwardly extending side flanges 16 which form a continuation of flanges 13. Apertures 17 are provided in the corners at the junction of top wall 14 and front wall 15. A lip 18 struck inwardly from the front wall is provided with an aperture 19. A latching plate 20 has flanges 21 fitting inside flanges 16 and is provided with inwardly struck lips 22 apertured, as indicated at 23, to register with aperture 19. The area of plate 20 between lips 22 is cut away so as to permit lip 18 to project therethrough when the latching plate is positioned adjacent front wall 15.

The upper ends of flanges 21 are tapered, as indicated at 24, to project through apertures 17 when the latching plate is in its uppermost position. A screw 25 extends through apertures 19 and 23. Aperture 19 is threaded to engage the screw but apertures 23 are not. The head 26 of the screw prevents displacement of the screw relative to one lip 22 and the other end of the screw is upset beyond the other lip 22, as indicated at 27 (Fig. 9), so that the screw is rotatably fixed relative to both lips 22. The result of this arrangement is that rotation of the screw moves latching plate 20 vertically relative to front wall 15 so that tapered ends 24 may be projected through apertures 17 or retracted therebelow.

The lower ends of flanges 16 of the L-shaped member are also tapered to form pointed ends 28 which are adapted to fit between flange 5 and the rear surface of cornice 2. After the lower ends of flanges 16 have been positioned, screw 25 is rotated to project tapered ends 24 through apertures 17 and between flange 4 and the rear surface of the cornice to hold the cornice securely adjacent the front wall of L-shaped member 12, as shown in Fig. 9.

Top wall 14 is provided with a longitudinal slot 29. A slidable member 30 comprises a top wall 31 having an aperture 32. A stud 33, extending through slot 29 and aperture 32, is provided with washers 34 and 35 so as to retain top wall 31 adjacent top wall 14 in sliding relationship. This sliding relationship is important when curtains or drapes are to be mounted behind the cornice because it permits the cornice to be moved forwardly, to provide more working space between the cornice and the wall of the room. After the curtains or drapes are hung, the cornice may be moved back into the desired position. No locking means is required, because the weight of the cornice will keep it in place.

Member 30 has depending flanges 36 and 37 fitting between flanges 13. Flange 37 is extended to form a curved side wall 38, the rear end of which is bent at right angles to form a curved brace 39 adapted to support the mounting bracket on the installation bracket. The upper edge of member 39 is bent to form a flange 40.

The cornice mounting bracket is attached to the side mounting installation bracket by positioning flange 40 over the top edge of lip 11 on installation bracket 6 and seating the bottom edge 41 in foot portion 9 abutting free end portion 10. When the top and bottom edges of brace 39 are positioned as above described, the concave surface of the brace engages flange 8 of the installation bracket to form a third point of support for the cornice mounting bracket. This three point support provides a firm and strong supporting means for holding the cornice.

A hook 42 is secured to side wall 38 by means of a bolt 43. The hook and side wall 38 each have an elongated opening 44 and 45, respectively, to receive the bolt so that the position of the hook may be adjusted to hold a curtain or drapery rod in exactly the position desired. Instead of a single hook 42, a pair of hooks may be mounted on each side wall 38 to support a curtain rod and a drapery rod.

Frequently the length of the cornice is so great that intermediate supports are required. In Fig. 3 I have shown a cornice mounting bracket suitable for furnishing intermediate support for the cornice. In this figure a flat plate 46 is substituted for installation bracket 6. This plate may be attached at any one or more desired intermediate points along the top of the window frame. Plate 46 is provided with a lip 47 engageable with flange 40 and a foot portion 48 adapted to support the bottom edge of side wall member 38. This structure is also capable of supporting the ends of the cornice, and may be used instead of brackets 6 if Venetian blinds are not present. It will be noted that the angular relationship between plate 46 and L-shaped member 12 is different than between plate 7 and member 12. If it is desired to mount plate 46 against the side of the window frame a suitable right angled flange may be added to the plate.

The structure of the drapery or curtain hook 49 as shown in Fig. 3 is different from hook 42 only in that the hook portion is offset from the securing portion to provide lateral spacing between member 12 and hook 49. Either hook 42 or 49 may be used with the cornice mounting bracket regardless of which installation bracket is used. Off-set hook 49 provides support for the curtain or drapery rod at the end thereof and closely adjacent the cornice ends, thereby enabling the curtains or draperies to be slidably supported on the rod throughout the length thereof without interference from the hook, as would be the case if the curtains or draperies were supported on the rod beyond hook 42.

Although two preferred embodiments of the invention have been described in considerable detail, it will be understood that the description thereof is intended to be illustrative, rather than restrictive, as many details may be modified or changed without departing from the spirit or scope of the invention. Accordingly, I do not desire to be restricted to the exact structures described.

I claim:

1. A bracket for mounting a cornice having inturned flanges at its top and bottom edges, said bracket comprising an L-shaped member having a top wall and a front wall, said front wall being engageable with the rear surface of the cornice, and means for engaging the opposing surfaces of each of the said inturned flanges whereby the cornice may be rigidly secured to the bracket.

2. A bracket for mounting a cornice having inturned flanges at its top and bottom edges, said bracket comprising an L-shaped member having a top wall and a front wall, said front wall being engageable with the rear surface of the cornice, the lower edge of said front wall being tapered to fit between said rear surface and said bottom flange, and a latching plate slidably mounted on said front wall, said latching plate having its upper edge projecting above the top wall of said L-shaped member when said latching plate is in its uppermost position, the upper edge of said latching plate fitting between said rear surface and said top flange.

3. A bracket for mounting a cornice having inturned flanges at its top and bottom edges, said bracket comprising an L-shaped member having a top wall and a front wall, said front wall being engageable with the rear surface of the cornice, the lower edge of said front wall being tapered to fit between said rear surface and said bottom flange, the top wall of said L-shaped member having an aperture adjacent its juncture with said front wall, a latching plate mounted adjacent said front wall, and screw means for moving said latching plate upwardly to project the upper edge of said plate through said aperture to engage said cornice between its rear surface and said top flange.

4. A bracket for mounting a cornice having inturned flanges at its top and bottom edges, said bracket comprising an L-shaped member having a top wall and a front wall, said front wall being engageable with the rear surface of the cornice, the lower edge of said front wall being tapered to fit between said rear surface and said bottom flange, the top wall of said L-shaped member having a pair of apertures adjacent its juncture with said front wall, a latching plate mounted adjacent said front wall, a pair of vertically aligned apertured lips struck inwardly from said front wall, a screw rotatably secured to said lips, a lip struck inwardly from said latching plate between said two first mentioned lips, said last mentioned lip having a threaded aperture engaging said screw whereby said latching plate may be moved vertically by rotation of said screw, and a pair of projections extending upwardly from the upper edge of said latching plate, said projections extending through the apertures in said top wall and engaging said cornice between its rear surface and said top flange when said latching plate is in its uppermost position.

5. In a cornice mounting, an installation bracket rigidly secured adjacent opposite ends of a window opening, each of said installation brackets comprising a flat plate having a pair of projections extending laterally therefrom, and a cornice mounting bracket engaging said projections at its opposite ends to secure it to said instalation bracket.

6. In a cornice mounting, an installation bracket rigidly secured adjacent opposite ends of a window opening, each of said installation brackets comprising a flat plate having a pair of projections extending laterally therefrom, and a cornice mounting bracket including a brace, said brace being detachably mounted at its opposite ends on said projections.

7. In a cornice mounting, an installation bracket rigidly secured adjacent opposite ends of a window opening, each of said installation brackets comprising a flat plate having a pair of projections extending laterally therefrom, and a mounting bracket including a brace, said brace being detachably mounted at its opposite ends on said projections, said brace being curved intermediate its ends to engage a portion of said installation bracket to form a third point of contact between said mounting bracket and said installation bracket.

8. In a cornice mounting, an installation bracket rigidly secured adjacent opposite ends of a window opening, each of said installation brackets comprising a flat plate having a pair of vertically spaced projections extending at right angles to said flat plate, and a mounting bracket including a brace having its bottom edge positioned on the lowermost of said vertically spaced projections and its upper edge bent over to fit over the top edge of the uppermost of said vertically spaced projections to secure said mounting bracket to said installation bracket.

9. In a cornice mounting, an installation bracket rigidly secured adjacent a window opening, said bracket having projections extending outwardly adjacent its top and bottom edges, and a mounting bracket comprising a pair of relatively slidable members, one of said slidable members having a brace engageable with said projections, said other slidable member having a latching plate helping to support the cornice.

10. In combination with a cornice having inturned flanges at its top and bottom edges, an installation bracket rigidly secured adjacent a window opening, said installation bracket comprising a flat plate having a pair of vertically spaced projections extending at right angles thereto and a flange bent at right angles to one vertical edge of said installation bracket, and a mounting bracket comprising an L-shaped member having a top wall and a front wall, the lower edge of said front wall fitting between the rear surface and the bottom flange of said cornice, a latching plate slidably mounted on said front wall, the upper end of said latching plate fitting between said rear surface and top flange of said cornice when said latching plate is in its uppermost position, whereby the lower edge of said front wall and the upper end of said latching plate co-operate to support said cornice on said cornice mounting bracket, a second top wall, said first mentioned top wall being slidably mounted with respect to said second top wall, a side wall depending from said second top wall, and a curved brace extending at right angles from said depending side wall, the top and bottom edges of said curved brace being engageable with said pair of vertically spaced projections, and the intermediate portion of said curved brace being engageable with the flange of said installation bracket to secure said mounting bracket to said installation bracket.

11. In combination with a cornice having inwardly extending flanges at its top and bottom edges, an installation bracket rigidly secured adjacent a window opening, and a mounting bracket detachably secured to said installation bracket, said mounting bracket including a front wall the lower edge of which is engageable with the rear of said cornice between the rear surface of said cornice and its bottom flange, and a latching plate slidably mounted on said front wall, the upper edge of said latching plate being engageable with the rear of said cornice between the rear surface of said cornice and its top flange, whereby said cornice is detachably secured to said mounting bracket.

12. In combination with a cornice having inwardly extending flanges at its top and bottom edges, an installation bracket rigidly secured adjacent a window opening, and a mounting bracket detachably secured to said installation bracket, said mounting bracket comprising an L-shaped member having a front wall, a top wall and a second top wall on which said first named top wall is slidably mounted, said front wall being detachably secured to said cornice and said second top wall being detachably secured to said installation bracket, whereby said cornice may be pulled outwardly from said window opening a distance equal to the relative sliding movement permitted between said two top walls of said mounting bracket.

13. A cornice mounting bracket comprising an L-shaped member having a top wall and a front wall, said top wall having an elongated slot extending longitudinally thereof, a relatively slidable member mounted on said top wall, said relatively slidable member including a top wall, a depending side wall, and a brace extending at right angles to said depending side wall, and a latching plate slidably mounted on said front wall.

14. In a cornice mounting, an installation bracket rigidly secured adjacent a window opening, said bracket having projections extending outwardly adjacent its top and bottom edges, and a mounting bracket, said mounting bracket having a brace engageable with said projections and a latching plate helping to support the cornice.

15. In combination with a cornice having inwardly extending flanges on its top and bottom edges, an installation bracket rigidly secured adjacent a window opening, and a mounting bracket detachably secured to said installation bracket, said mounting bracket comprising a member engageable with the rear surface of said cornice, and means for wedging said member between the opposing surfaces of said inwardly extending flanges whereby the cornice may be rigidly secured to the mounting bracket.

16. A bracket for mounting a cornice having inturned flanges at its top and bottom edges to an installation bracket rigidly secured adjacent a window opening, said bracket comprising a member engageable with the rear surface of said cornice, means for engaging the opposing surfaces of the said internal flanges whereby the cornice may be rigidly secured to the bracket, and a brace for detachably securing said bracket to said installation bracket, said brace being curved intermediate its ends and having an engaging means at its upper end adapted to engage said installation bracket.

BÉLA B. JUNKUNC.

REFERENCES CITED

The following references are of record in the file of this patent:

UNITED STATES PATENTS

| Number | Name | Date |
|---|---|---|
| 1,911,749 | Chambers | May 30, 1933 |
| 2,323,496 | Stern | July 6, 1943 |